(12) United States Patent
Lehtovirta et al.

(10) Patent No.: US 10,750,361 B2
(45) Date of Patent: Aug. 18, 2020

(54) KEY MANAGEMENT

(71) Applicant: Telefonaktiebolaget LM Ericsson (publ), Stockholm (SE)

(72) Inventors: Vesa Lehtovirta, Espoo (FI); Noamen Ben Henda, Stockholm (SE); Lars-Bertil Olsson, Angered (SE); Paul Schliwa-Bertling, Ljungsbro (SE); Magnus Stattin, Upplands Väsby (SE); Vesa Torvinen, Sauvo (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/072,483

(22) PCT Filed: Nov. 25, 2016

(86) PCT No.: PCT/EP2016/078888
§ 371 (c)(1),
(2) Date: Jul. 24, 2018

(87) PCT Pub. No.: WO2017/129288
PCT Pub. Date: Aug. 3, 2017

(65) Prior Publication Data
US 2019/0037395 A1    Jan. 31, 2019

Related U.S. Application Data

(60) Provisional application No. 62/286,611, filed on Jan. 25, 2016.

(51) Int. Cl.
*H04W 12/04*    (2009.01)
*H04L 29/06*    (2006.01)
(Continued)

(52) U.S. Cl.
CPC ............ *H04W 12/04* (2013.01); *H04L 9/0891* (2013.01); *H04L 63/062* (2013.01);
(Continued)

(58) Field of Classification Search
CPC combination set(s) only.
See application file for complete search history.

(56) References Cited

U.S. PATENT DOCUMENTS 9,930,016 B2   3/2018   Ryoo et al.
9,960,926 B2   5/2018   Oyman
(Continued)

FOREIGN PATENT DOCUMENTS

RU    2014107661 A       9/2015
WO    WO-2014067541 A1 *  5/2014
(Continued)

OTHER PUBLICATIONS

International Search Report and Written Opinion of the International Searching Authority, PCT/EP2016/078888, dated Jan. 31, 2017, 10 pages.
(Continued)

*Primary Examiner* — Said M Elnoubi
(74) *Attorney, Agent, or Firm* — Sage Patent Group (57) ABSTRACT

A basestation in a cellular communications network is operable to send a message to a Mobility Management Entity, relating to a suspension or resumption of a connection of a UE, wherein the message contains key renewal information. The Mobility Management Entity receives the message, and determines whether a key renewal condition is met. If the key renewal condition is met, the MME forwards a new NH, NCC pair to the base station. If a message received from the MME includes a NH, NCC pair, the basestation derives keying information using the NH, NCC pair for future use in deriving keys.

22 Claims, 7 Drawing Sheets

(51) Int. Cl.
| | |
|---|---|
| *H04W 4/70* | (2018.01) |
| *H04W 76/19* | (2018.01) |
| *H04W 76/27* | (2018.01) |
| *H04L 9/08* | (2006.01) |
| *H04W 8/08* | (2009.01) |
| *H04W 12/08* | (2009.01) |

(52) U.S. Cl.
CPC ............ *H04L 63/068* (2013.01); *H04W 4/70* (2018.02); *H04W 8/08* (2013.01); *H04W 76/19* (2018.02); *H04W 76/27* (2018.02); *H04W 12/08* (2013.01)

(56) References Cited

U.S. PATENT DOCUMENTS

| | | | | |
|---|---|---|---|---|
| 2012/0163336 | A1* | 6/2012 | Adjakple | H04W 12/04 370/331 |
| 2015/0111577 | A1* | 4/2015 | Bao | H04W 36/24 455/436 |
| 2015/0189689 | A1* | 7/2015 | Wang | H04L 5/0055 370/329 |
| 2016/0183175 | A1* | 6/2016 | Keller | H04W 8/24 370/328 |
| 2016/0191471 | A1* | 6/2016 | Ryoo | H04W 12/04 455/411 |

FOREIGN PATENT DOCUMENTS

| | | |
|---|---|---|
| WO | WO 2015/018448 A1 | 2/2015 |
| WO | WO 2015/020449 A1 | 2/2015 |

OTHER PUBLICATIONS

3$^{rd}$ Generation Partnership Project; Technical Specification Group Services and System Aspects; Architecture Enhancements for Cellular Internet of Things, (Release 13) 3GPP TR 23.720 V1.2.0 (Nov. 2015) 96 pages.

3$^{rd}$ Generation Partnership Project; Technical Specification Group Services and System Aspects; Architecture Enhancements for Cellular Internet of Things, (Release 13) 3GPP TR 23.720 V1.2.0 (Nov. 2015) 99 pages.

3$^{rd}$ Generation Partnership Project; Technical Specification Group Services and System Aspects; 3GPP System Architecture Evolution (SAE); Security Architecture (Release 13) 3GPP TS 33.401 V13.1.0 (Dec. 2015) 135 pages.

"RRC Connection Suspend and Resume," 3GPP TSG-RAN WG2 NB-IOT Ad-hoc Meeting (Tdoc R2-160475) Budapest, Hungary, Jan. 19-21, 2016, Agenda Item 05.1.2, Ericsson, Discussion Document, 14 pages.

"Security Aspects of NB-IoT," 3GPP TSG-RAN WG2 NB-IOT Ad-hoc Meeting (Tdoc R2-160476) Budapest, Hungary, Jan. 19-21, 2016, Agenda Item 04.3, Ericsson, Discussion Document, 4 pages.

English Translation of Search Report for Russian Patent Application No. 2018130669, completed May 23, 2019, 2 pages.

* cited by examiner

KEY MANAGEMENT

CROSS REFERENCE TO RELATED APPLICATIONS

This application is a 35 U.S.C. § 371 national stage application of PCT International Application No. PCT/EP2016/078888 filed on Nov. 25, 2016, which in turns claims domestic priority to U.S. Provisional Patent Application No. 62/286,611, filed on Jan. 25, 2016, the disclosures and content of which are incorporated by reference herein in their entirety.

TECHNICAL FIELD

This invention relates to a method of operation of a terminal device and a network node in a cellular communications network.

BACKGROUND

The Cellular Internet of Things (CIoT) is a new radio technology that is able to provide extended coverage for harsh environments, for example, basements, and is designed to serve massive number of UEs (over 50,000 per base station) using a very limited bandwidth (e.g. 160 bps).

The aim is to be able to support highly efficient handling of frequent and infrequent small data transmissions with minimised overhead for system signalling, without compromising security. Contributors to the signalling overhead may be procedures required for UE state transition, for example at transitions between the Idle state and the Connected state. Although these procedures may be used when the UE is an IoT UE, which may require infrequent connection to the network, the procedures may be used for any type of UE.

In order to reduce the signalling overhead and the associated processing load in the network, a solution has been proposed that is based on the re-use of information from the previous RRC connection for the subsequent RRC connection setup.

The signalling overhead reduction is realized by introducing two new procedures 'RRC Suspend' and 'RRC Resume' and the introduction of a modified UE behaviour in new CIoT Idle state where relevant information is stored when the UE transitions to the Idle state, triggered by a RRC Suspend procedure, and re-used for a subsequent connection setup by the UE. Although examples are given here relating to cases where the UE is a CIoT UE, the 'RRC Suspend' and 'RRC Resume' procedures, or similar, can be used with any UE.

It is suggested to keep the Access Stratum Security Context in the eNB. At suspension of an RRC connection, the eNB instructs the UE how to derive the security key for the subsequent resumption, i.e. it provides the UE with the security algorithm configuration and the Next Hop Chaining Counter (NCC) associated with the $K_{eNB}$ that is to be used at subsequent resumption.

This may require that the $K_{eNB}$ is stored in the eNB for prolonged periods of time when the RRC connection is suspended. This increases the risk that the $K_{eNB}$ is leaked from eNB, which may be deployed in a vulnerable location. If an attacker would get hold of such leaked $K_{eNB}$, she/he would be able to make malicious use of such $K_{eNB}$ as long the $K_{eNB}$ (or derivatives of such $K_{eNB}$) are used to secure the communication between the UE and the eNB.

SUMMARY

According to the present invention there is provided a method of a Mobility Management Entity in a cellular communications network. The method comprises receiving a message from a base station, relating to a suspension or resumption of a connection of a UE; determining whether a key renewal condition is met; and if the key renewal condition is met, forwarding a new NH, NCC pair to the base station.

According to the present invention there is provided a Mobile Management Entity for use in a communications network. The Mobile Management Entity is configured to receive a message from a base station, relating to a suspension or resumption of a connection of a UE; determine whether a key renewal condition is met; and if the key renewal condition is met, forward a new NH, NCC pair to the base station.

According to the present invention there is provided a Mobile Management Entity for use in a communications network. The mobile management entity comprises a processor and a memory, the memory containing instructions executable by the processor, such that the mobile management entity is operable to: receive a message from a base station, relating to a suspension or resumption of a connection of a UE; determine whether a key renewal condition is met; and if the key renewal condition is met, forwarding a new NH, NCC pair to the base station.

According to the present invention there is provided a Mobile Management Entity for use in a communications network. The Mobile Management Entity comprising: a receiving module for receiving a message from a base station, relating to a suspension or resumption of a connection of a UE; a determination module for determining whether a key renewal condition is met; and a forwarding module for if the key renewal condition is met, forwarding a new NH, NCC pair to the base station.

According to the present invention there is provided a method of operation of a base station in a cellular communications network. The method comprises: sending a message to a Mobility Management Entity in the cellular communications network, relating to a suspension of a connection of a UE, wherein the message contains key renewal information; and if a message received from the Mobility Management Entity includes a NH, NCC pair, deriving keying information using the NH, NCC pair for future use in deriving keys.

According to the present invention there is provided a basestation for use in a communications network. The basestation is configured to send a message to a Mobility Management Entity in the cellular communications network, relating to a suspension of a connection of a UE, wherein the message contains key renewal information; and if a message received from the Mobility Management Entity includes a NH, NCC pair, derive keying information using the NH, NCC pair for future use in deriving keys.

According to the present invention there is provided a basestation for use in a communications network, the basestation comprising a processor and a memory, the memory containing instructions executable by the processor, such that the mobile management entity is operable to: send a message to a Mobility Management Entity in the cellular communications network, relating to a suspension of a connection of a UE, wherein the message contains key renewal information; and if a message received from the Mobility Management Entity includes a NH, NCC pair, derive keying information using the NH, NCC pair for future use in deriving keys.

According to the present invention there is provided a basestation for use in a communications network. The basestation comprises: a sending module sending a message to a Mobility Management Entity in the cellular communications network, relating to a suspension of a connection of a UE, wherein the message contains key renewal information; and a deriving module for if a message received from the Mobility Management Entity includes a NH, NCC pair, deriving keying information using the NH, NCC pair for future use in deriving keys.

According to the present invention there is provided a computer program configured, when run on a computer, to carry out any of the previous methods. According to the present invention there is provided a computer program product comprising a computer readable medium and such a computer program.

Certain embodiments of the invention therefore allow security to be maintained in an efficient manner.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

A cell is associated with a base station, where a base station comprises in a general sense any network node transmitting radio signals in the downlink (DL) and/or receiving radio signals in the uplink (UL), also referred to as a radio access node. Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Figure 1:
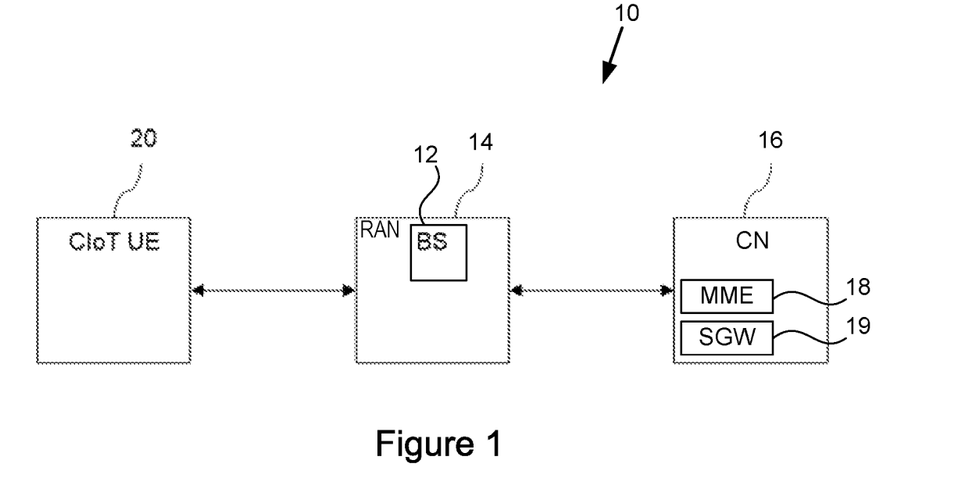
FIG. 1 illustrates a part of a cellular communications network.

FIG. 1 illustrates a part of a cellular communications network 10. The network 10 comprises a radio access node or base station 12, forming part of a radio access network (RAN) 14 of the cellular communications network 10. The RAN 14 is connected to a core network (CN) 16 of the cellular communications network 10. The core network 16 includes nodes such as a Mobility Management Entity (MME) 18 and a Serving Gateway (SGW) 19. FIG. 1 also shows by way of example a Cellular Internet of Things (CIoT) terminal device (UE) 20 having a connection to the base station 12. Of course, a network will typically include many base stations, and a very large number of terminal devices, but the present FIG. 1 is sufficient for an understanding of the present invention. The terminal device may be any user equipment device or may be a device that connects automatically to the network as required, and may be fixed or portable. The terms user equipment (UE) and mobile station (MS) are both used herein to refer to the terminal device. Methods are described herein involving a base station in the form of an eNodeB (eNB), but it will be appreciated that any radio access node can participate in the methods disclosed.

Figure 2:
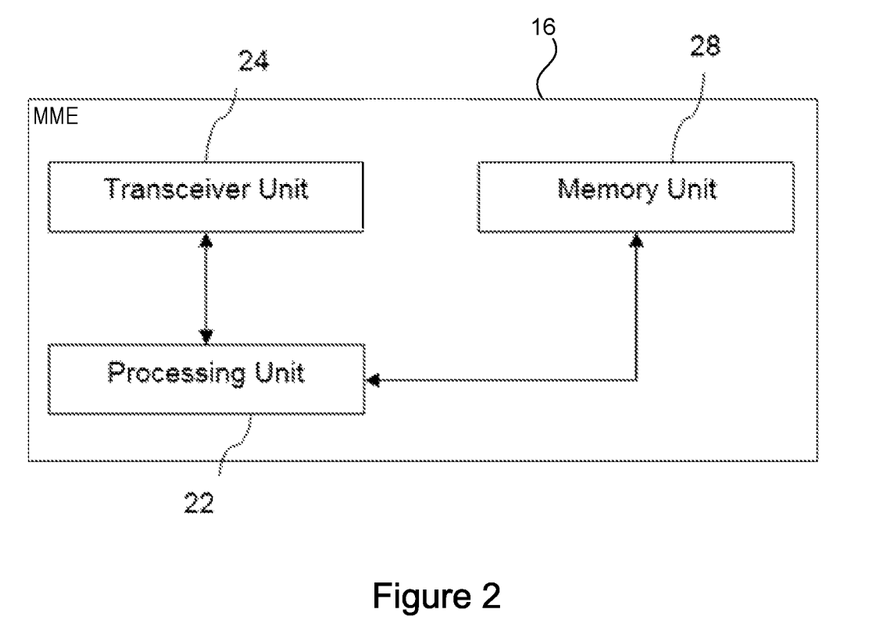
FIG. 2 illustrates a core network node in the network of FIG. 1.

FIG. 2 shows the form of the Mobility Management Entity (MME) 18 that can be adapted or configured to operate according to one or more of the non-limiting example embodiments described. The MME 18 comprises a processor or processing unit 22 that controls the operation of the MME 18. The processing unit 22 is connected to a transceiver unit 24, which is used to transmit signals to and receive signals from other nodes in the network 10. The MME 18 also comprises a memory or memory unit 28 that is connected to the processing unit 22 and that contains instructions or computer code executable by the processing unit 22 and other information or data required for the operation of the MME 18 in accordance with the methods described herein.

Figure 3:
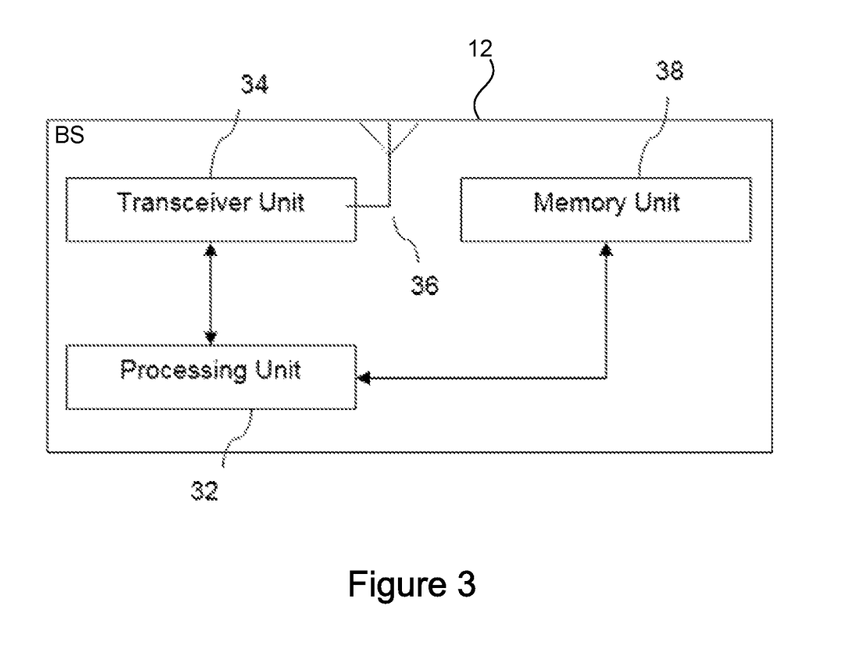
FIG. 3 illustrates a radio access node in the network of FIG. 1.

FIG. 3 shows a radio access node or base station (BS) 12 that can be adapted or configured to operate according to one or more of the non-limiting example embodiments described. The base station 12 comprises a processor or processing unit 32 that controls the operation of the base station 12. The processing unit 32 is connected to a transceiver unit 34 (which comprises a receiver and a transmitter) with associated antenna(s) 36 which are used to transmit signals to and receive signals from terminal device(s) 20. The base station 12 also comprises a memory or memory unit 38 that is connected to the processing unit 32 and that contains instructions or computer code executable by the processing unit 32 and other information or data required for the operation of the base station 12 in accordance with the methods described herein.

Embodiments are described herein, in which the radio access node or base station (BS) 12 is in the form of an eNodeB (eNB).

In order to reduce the signalling overhead, procedures exist, whereby relevant information is stored when the UE transitions to the Idle state, triggered by a RRC Suspend procedure, and is re-used for a subsequent connection setup by the UE.

In embodiments described in more detail below, information relating to each derivation of security parameters (e.g. $K_{eNB}$ derivation) conducted at the eNB is added to the signaling used on the S1AP, in order to inform the MME about each such derivation. In other embodiments, the MME could have other policies, for example a time-based policy as to when to derive a new NH.

A local policy in the MME may determine that a new $K_{eNB}$ is needed, for example if the number of derivation attempts reaches a limit and according to the policy no further derivation is feasible. In that case, the MME may supply the eNB with a new Next Hop (NH), Next Hop Chaining Counter (NCC) pair (with the NH value being an 'intermediate key' parameter that is used in the derivation of the AS base key, $K_{eNB*}$, and NCC being a parameter that indicates the number of vertical key derivations that has been performed since the initial $K_{eNB}$) which the eNB uses to derive a new $K_{eNB}$.

There is no theoretical limit to how many derivations can be done, but instead this could be just a threshold or policy set in the MME.

Alternatively, the eNB can have a local policy and, when the conditions of the local policy are met, the eNB may request (in the signaling used on the S1AP) the MME to provide a new NH, NCC pair. The MME can then, possibly after checking its own policy, decide whether to provide a new NH, NCC pair.

This solution ensures that Access Stratum Security is maintained when the Access Stratum context is cached in the RAN and UE.

Figure 4:
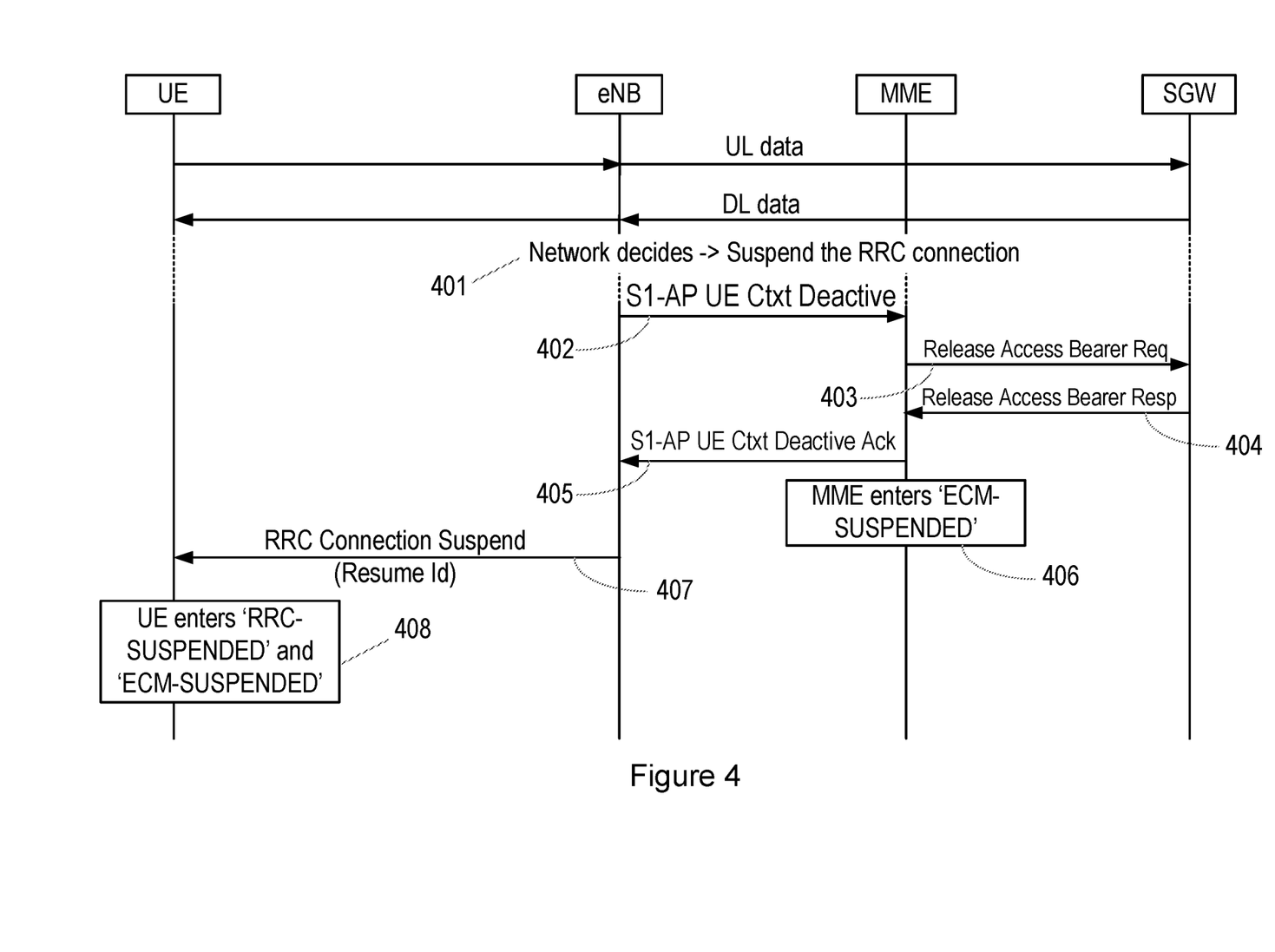
FIG. 4 illustrates a first procedure in use in the network of FIG. 1.

FIG. 4 illustrates an example of a suspension procedure, performed in a cellular communications network between a terminal device (UE), a base station in the form of an eNodeB (eNB) in the Radio Access Network, and a Mobility Management Entity (MME) and a Serving Gateway (S-GW) of the Extended Packet Core network.

At the start of the procedure, the UE is transmitting uplink (UL) data, which is passed through the eNB to the S-GW and on through the network, and the S-GW is forwarding downlink (DL) data through the eNB to the UE.

At step 401, the network, specifically the eNB, decides to suspend the RRC Connection.

At step 402, the eNB indicates to the MME with a S1AP UE Context DeActive message that the UE's RRC connection is suspended. The MME and the eNB store the S1AP association and the related UE Contexts.

The MME stores the DL TEIDs associated with the UE and eNodeB. Furthermore, the MME stores the values of NH and NCC to be used later.

In some embodiments, the eNB may indicate in the S1AP message the number of key derivations performed with the current $K_{eNB}$. In some other embodiments, the eNB may indicate in the S1AP message that another security parameter derivation is needed. The message sent from the eNB to the MME may include these or other forms of key renewal information.

At step 403, the MME sends a Release Access Bearers Request (Abnormal Release of Radio Link Indication) message to the SGW, requesting the release of all S1-U bearers for the UE. The SGW considers the UE as being in the Idle state.

At step 404, the SGW provides a Release Access Bearer Response message to the MME, confirming the release of all S1-U bearers for the UE.

At step 405, the MME sends a message to the eNB, acknowledging the Context Deactivation.

In addition, in response to the S1AP UE Context DeActive message received from the eNB, the MME determines based on its policy whether a key renewal condition is met. Where the message received from the eNB contained key renewal information, the MME may determine whether a key renewal condition is met based on the key renewal information. For example, the MME may determine based on the key renewal information whether a number of derivations has reached a limit.

Alternatively, the MME may determine whether a certain time has elapsed since the last NH derivation.

In other embodiments, the policy can be specific to the UE or to the type of UE. For example, the policy can be based on the subscription information of the UE. As another example, the policy is based on the type of the UE, for example if it is a CIoT UE that needs to save battery.

The policy may alternatively or additionally take account of other factors. For example, the policy in the MME may state that the NH derivation is always performed.

Whichever criteria are considered, if a key renewal condition is met, the MME steps the NCC counter and derives a new NH value and, stores the values and provides the new NH, NCC pair to the eNB.

At step 406, the MME enters the 'ECM-SUSPENDED' state.

At step 407, the At step 407, the eNB sends a message to the UE, suspending the RRC Connection of the UE. If a fresh NH, NCC pair was provided by the MME, the eNB derives a new $K_{eNB}$.

The message sent to the UE includes an identifier (Resume ID) that is used at subsequent resumption of that suspended RRC Connection. The UE and the eNB store the related Context information, i.e. RRC configuration, bearer configuration (including RoHC state information), Access Stratum Security Context and L2/1 parameters when applicable. This message also contains the security algorithm configuration and the Next Hop Chaining Counter (NCC) associated with the K_eNB that is to be used at subsequent resumption.

In another embodiment, if a new NH and NCC have been provided by the MME, the eNodeB may executes the RRC SMC procedure in order to establish a use of the new $K_{eNB}$ at the UE. That enables the UE and eNodeB to perform a fast RRC resume when the UE returns sometimes later.

In step 408, the UE RRC layer enters an RRC-SUSPENDED state and the UE EMM layer enters an ECM-SUSPENDED state.

Figure 5:
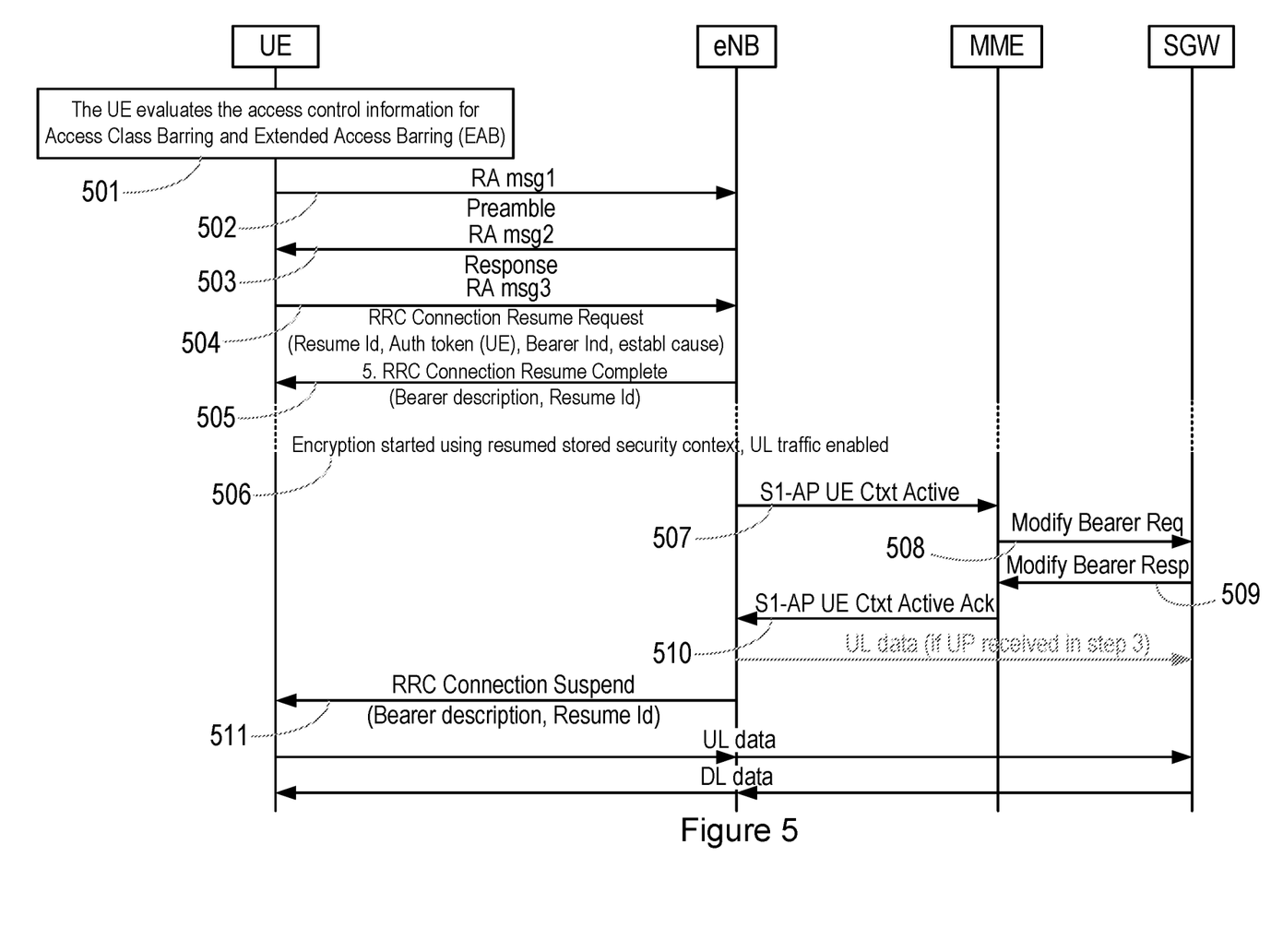
FIG. 5 illustrates a second procedure in use in the network of FIG. 1.

FIG. 5 illustrates an example of a first resumption procedure, performed in a cellular communications network between a terminal device (UE), a base station in the form of an eNodeB (eNB) in the Radio Access Network, and a Mobility Management Entity (MME) and a Serving Gateway (S-GW) of the Extended Packet Core network.

At step 501, the UE evaluates the access control information for Access Class Barring and Extended Access Barring (EAB), and at step 502 it sends the RA msg 1 (Preamble). At step 503, the eNB replies with the RA msg 2 (Response) in accordance with the legacy procedure when the UE accesses the network from the RRC Idle state.

In step 504, in msg3, the UE sends a RRC Connection Resume Request message, in which the UE includes its Resume ID, an Authentication Token, Bearer Ind, and Establishment Cause. The eNB uses the Resume ID to associate the UE with the previously stored UE Context. Additionally, msg3 can also contain User Plane multiplexed by MAC as per existing specifications where resumed stored security context is used to encrypt the User Plane. The Authentication Token can be based on the existing means to authenticate a UE at RRC re-establishment as specified in 3GPP TS 36.331.

At step 505, in message 4, designated here as the RRC Connection Resume Complete message, the network indicates which DRBs are resumed, and furthermore it includes the Resume ID and if applicable updated L2/1 parameters.

At step 506, the UE and the eNB resume using the stored security context for encryption. This uses the keys indicated in the RRC connection suspend message.

At step 507, the eNB notifies the MME about the change of state of the UE in a S1AP message designated here as S1-AP UE Context Active. ECM in the MME enters the ECM-CONNECTED state. The MME identifies that the UE returns at the eNodeB for which the MME has stored information about allocated DL TEIDs for the UE.

In some embodiments, the eNB may indicate the number of key derivations performed with the current $K_{eNB}$. In some other embodiments, the eNB may indicate in the S1AP message that another security parameter derivation is needed. The message sent from the eNB to the MME may include these or other forms of key renewal information.

In step 508, the MME sends a Modify Bearer Request message (eNodeB address, S1 TEID(s) (DL) for the accepted EPS bearers, Delay Downlink Packet Notification Request, RAT Type) per PDN connection to the Serving GW.

If the Serving GW supports Modify Access Bearers Request procedure and if there is no need for the Serving GW to send the signalling to the PGW, the MME may send Modify Access Bearers Request (eNodeB address(es) and TEIDs for downlink user plane for the accepted EPS bearers, Delay Downlink Packet Notification Request) per UE to the Serving GW to optimize the signalling.

The Serving GW is now able to transmit downlink data towards the UE, and the SGW considers the UE as being in a Connected state.

In step 509, the SGW sends a Modify Bearer Response message to the MME.

In step 510, the MME sends a message to the eNB as an acknowledgment, specifically an S1-AP UE Context Active Ack message.

In addition, in response to the S1AP UE Context Active message received from the eNB, the MME determines based on its policy whether a key renewal condition is met. Where the message received from the eNB contained key renewal information, the MME may determine whether a key renewal condition is met based on the key renewal information. For example, the MME may determine based on the key renewal information whether a number of derivations has reached a limit.

Alternatively, the MME may determine whether a certain time has elapsed since the last NH derivation. The policy may alternatively or additionally take account of other factors. For example, the policy in the MME may state that the NH derivation is always performed.

Whichever criteria are considered, if a key renewal condition is met, the MME steps the NCC counter and derives a new NH value and provides the new NH, NCC pair to the eNB.

After step 510, User Plane can be sent towards the SGW.

As an alternative to the transmission of the RRC Connection Resume Complete message in step 505, if the msg 3 in step 504 included User Plane and indication that all User Plane is transmitted, the eNB can suspend the RRC connection and implicitly indicate that the User Plane was successfully received.

Thus, in some embodiments, the eNB is enabled to have a "fresh" $K_{eNB}$ without needing to run AKA or without the need to make an idle to active transition, since both of those alternatives would defeat the target of reducing signalling overhead. In this contect, a "fresh" $K_{eNB}$ means a $K_{eNB}$, which is coming from the core network and which is not derived only from the existing $K_{eNB}$ stored in the eNB. This is accomplished by the MME sending a new fresh NH, NCC pair to the eNB during the RRC suspend handling (for example in the S1-AP UE Context Deactive Ack) or in the RRC resume handling (for example in the S1-AP UE Context Active Ack) from which the "fresh" $K_{eNB}$ can be derived.

In all of the embodiments described herein, the RRC Connection Suspend message, the RRC Connection Resume Request message and the RRC Connection Resume Complete message could either be new RRC messages or could be legacy RRC messages already defined in TS 36.331 which are re-used and enhanced to support the suspend and resume procedures described herein.

Figure 6:
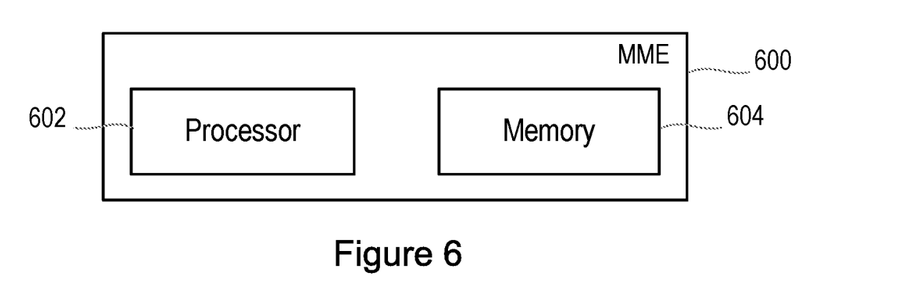
FIG. 6 illustrates a Mobile Management Entity in the network of FIG. 1.

FIG. 6 illustrates shows a Mobile Management Entity (MME) 600 that can be adapted or configured to operate according to one or more of the non-limiting example embodiments described. The MME 600 comprises a processor or processing unit 602 that controls the operation of the MME 600. The MME 600 also comprises a memory or memory unit 604 that is connected to the processing unit 602 and that contains instructions or computer code executable by the processing unit 602 and other information or data required for the operation of the MME 600 in accordance with the methods described herein.

Figure 7:
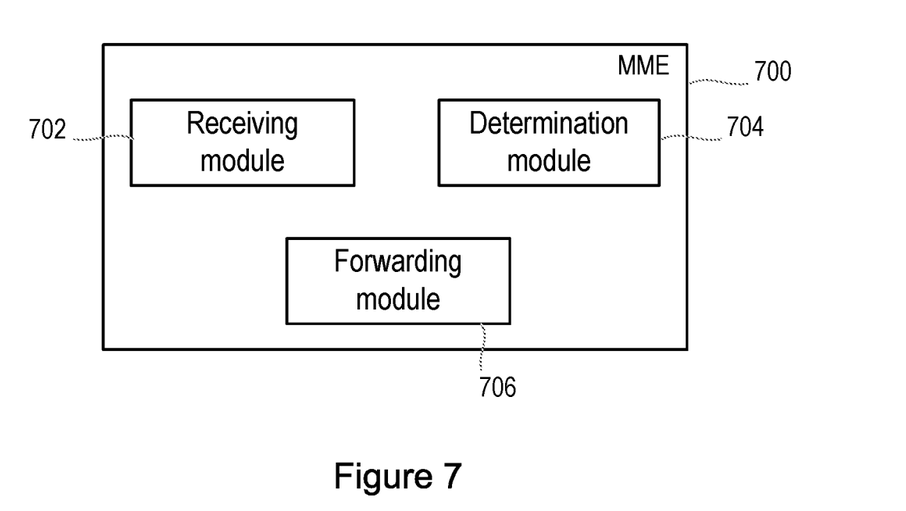
FIG. 7 illustrates a Mobile Management Entity in the network of FIG. 1
Figure 8:
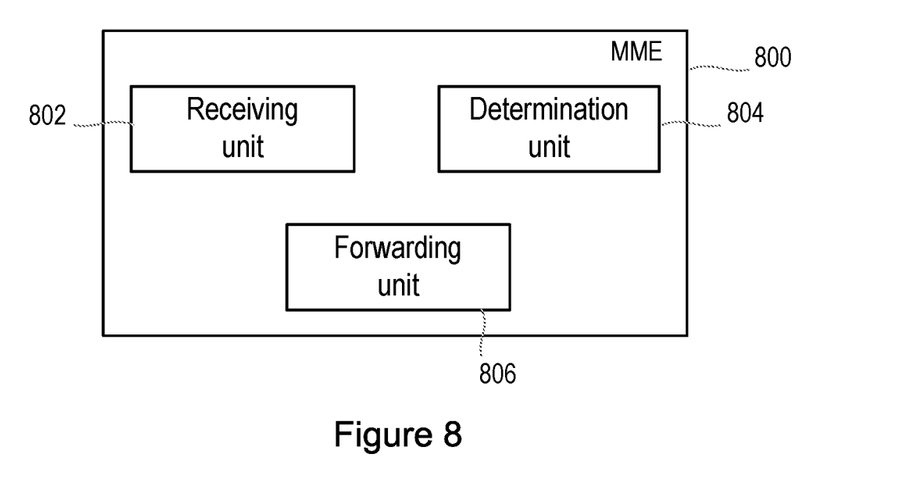
FIG. 8 illustrates a Mobile Management Entity in the network of FIG. 1.

FIGS. 7 and 8 illustrate functional units in embodiments of a Mobility Management Entity 700 and 800 which may execute any of the methods described herein, for example according to computer readable instructions received from a computer program. It will be understood that the modules illustrated in FIG. 7 are software implemented functional units, and may be realised in any appropriate combination of software modules. It will be understood that the units illustrated in FIG. 8 are hardware implemented functional units, and may be realised in any appropriate combination of hardware units.

FIG. 7 illustrates a Mobile Management Entity (MME) 700 according to embodiments. The MME 700 comprises a receiving module 702 for receiving a message from a base station, relating to a suspension or resumption of a connection of a UE; a determination module 704 for determining whether a key renewal condition is met; and a forwarding module 706 for if the key renewal condition is met, forwarding a new NH, NCC pair to the base station.

FIG. 8 illustrates a Mobile Management Entity (MME) 800 according to embodiments. The MME 800 comprises a receiving unit 802 for receiving a message from a base station, relating to a suspension or resumption of a connection of a UE; a determination unit 804 for determining whether a key renewal condition is met; and a forwarding unit 806 for if the key renewal condition is met, forwarding a new NH, NCC pair to the base station.

Figure 9:
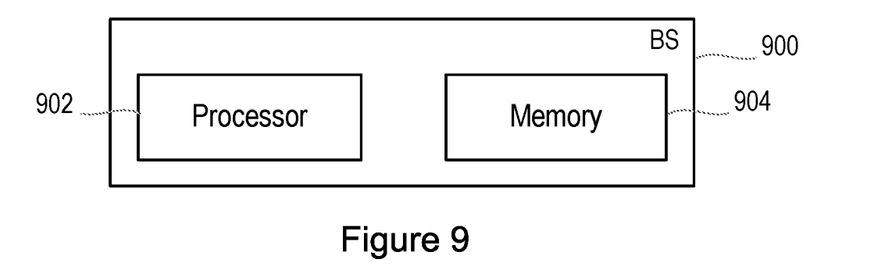
FIG. 9 illustrates a base station in the network of FIG. 1.

FIG. 9 illustrates shows a basestation (BS) 900 that can be adapted or configured to operate according to one or more of the non-limiting example embodiments described. The BS 900 comprises a processor or processing unit 902 that controls the operation of the BS 900. The BS 900 also comprises a memory or memory unit 904 that is connected to the processing unit 902 and that contains instructions or computer code executable by the processing unit 902 and other information or data required for the operation of the BS 900 in accordance with the methods described herein.

Figure 10:
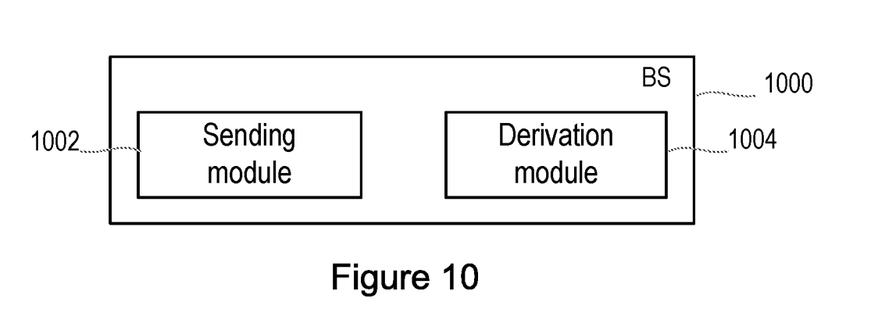
FIG. 10 illustrates a base station in the network of FIG. 1.
Figure 11:
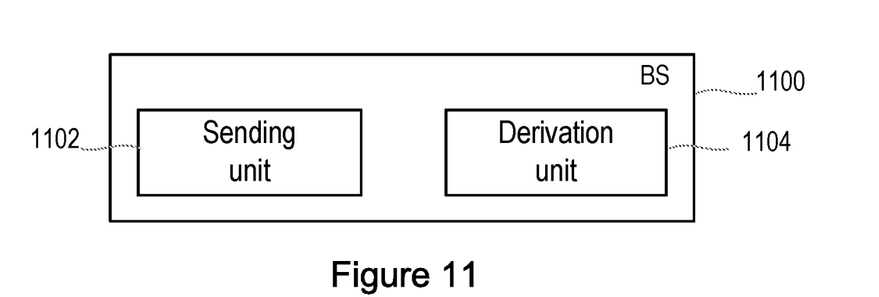
FIG. 11 illustrates a base station in the network of FIG. 1.

FIGS. 10 and 11 illustrate functional units in embodiments of a basestation 1000 and 1100 which may execute any of the methods described herein, for example according to computer readable instructions received from a computer program. It will be understood that the modules illustrated in FIG. 10 are software implemented functional units, and may be realised in any appropriate combination of software modules. It will be understood that the units illustrated in FIG. 11 are hardware implemented functional units, and may be realised in any appropriate combination of hardware units.

FIG. 10 illustrates a basestation 1000 according to embodiments. The basestation 1000 comprises a sending module 1002 for sending a message to a Mobility Management Entity in the cellular communications network, relating to a suspension of a connection of a UE, wherein the message contains key renewal information; and a deriving module 1004 for if a message received from the Mobility Management Entity includes a NH, NCC pair, deriving keying information using the NH, NCC pair for future use in deriving keys.

FIG. 11 illustrates a basestation 1100 according to embodiments. The basestation 1100 comprises a sending unit 1102 for sending a message to a Mobility Management Entity in the cellular communications network, relating to a suspension of a connection of a UE, wherein the message contains key renewal information; and a deriving unit 1104 for, if a message received from the Mobility Management Entity includes a NH, NCC pair, deriving keying information using the NH, NCC pair for future use in deriving keys.

Figure 12:
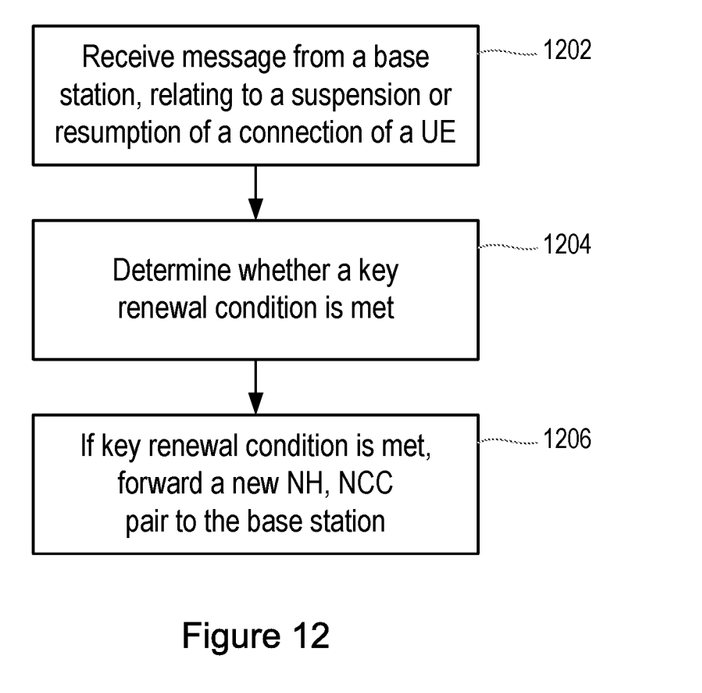
FIG. 12 illustrates a process performed in a Mobility Management Entity.

FIG. 12 illustrates a process performed in a Mobility Management Entity in a cellular communications network.

At step 1202, the MME receives a message from a base station, relating to a suspension or resumption of a connection of a UE. As an example, the message may be a message indicating that the connection to the UE is being suspended. As another example, the message may be a message indicating that the connection to the UE is being resumed after a suspension.

At step 1204, the MME determines whether a key renewal condition is met.

The message received from the base station may indicate a number of key derivations performed with existing keying material, in which case determining whether a key renewal condition is met may comprise determining whether said number of key derivations performed with existing keying material has reached a threshold number.

Determining whether a key renewal condition is met may comprise determining whether a time elapsed since forwarding an existing NH, NCC pair to the base station has reached a threshold time.

The message received from the base station may include a request for a new NH, NCC pair, in which case the MME may determine that the key renewal condition is met if the message received from the base station does include a request for a new NH, NCC pair. Alternatively, the MME may determine that the key renewal condition is met if the message received from the base station includes a request for a new NH, NCC pair and if an additional criterion is satisfied.

If the MME determines at step 1204 that the key renewal condition is met, then, at step 1206, the MME forwards a new NH, NCC pair to the base station.

If the key renewal condition is met, the MME may derive the NH value before forwarding the new NH, NCC pair to the base station. The MME may also store the values of the NH, NCC pair.

Figure 13:
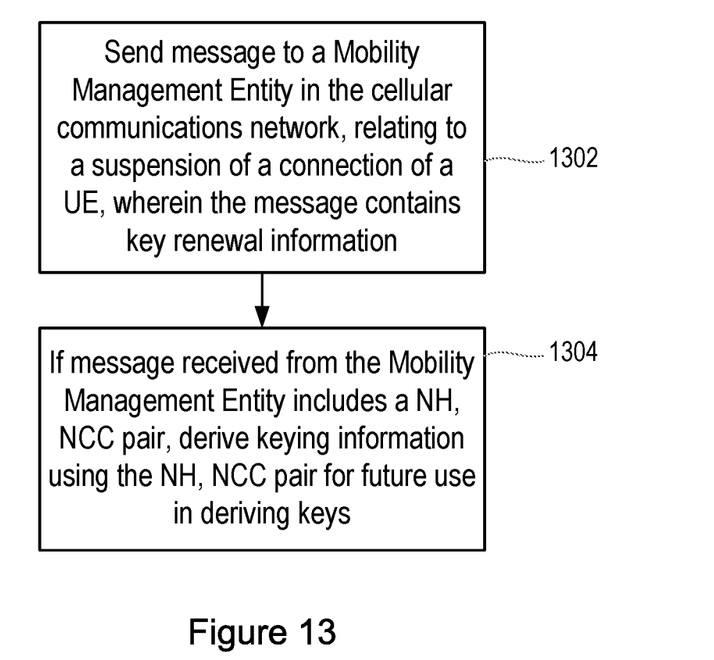
FIG. 13 illustrates a process performed in a basestation.

FIG. 13 illustrates a process performed in a base station in a cellular communications network.

At step 1302, the base station sends a message to a Mobility Management Entity in the cellular communications network, relating to a suspension of a connection of a UE, wherein the message contains key renewal information.

The message may be a message indicating that the connection of the UE is being suspended. The message may be a message indicating that the connection of the UE is being resumed after suspension.

The key renewal information may comprise a number of key derivations performed with existing keying material. The key renewal information may comprise a request for a new NH, NCC pair.

At step 1304, if a message received from the Mobility Management Entity includes a NH, NCC pair, the base station derives keying information using the NH, NCC pair for future use in deriving keys. The base station may then use at least one of said derived keys in future communications with said UE.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a Mobility Management Entity ("MME") in a cellular communications network, the method comprising:
   receiving, by the MME, a message from a base station, relating to a suspension or resumption of a connection of a user equipment ("UE"), the suspension or resumption of the connection of the UE being associated with a transition to or from an idle state;
   in response to receiving the message, determining, by the MME based on a local policy, whether a key renewal condition is met, the local policy being stored at the MME; and
   if the key renewal condition is met, forwarding, by the MME, a new next hop ("NH"), next hop chaining counter ("NCC") pair to the base station.

2. The method as defined in claim 1, wherein the message received from the base station indicates a number of key derivations performed with existing keying material, and wherein determining whether the key renewal condition is met comprises determining whether the number of key derivations performed with existing keying material has reached a threshold number indicated in the local policy.

3. The method as defined in claim 1, wherein determining whether the key renewal condition is met comprises determining whether a time elapsed since forwarding an existing NH, NCC pair to the base station has reached a threshold time indicated in the local policy.

4. The method as defined in claim 1, further comprising determining that the key renewal condition is met if the message received from the base station includes a request for the new NH, NCC pair and if an additional criterion indicated in the local policy is satisfied.

5. The method as defined in claim 1, wherein the message received from the base station, relating to the suspension or the resumption of the connection of the UE, indicates that the connection to the UE is being suspended.

6. The method as defined in claim 1, wherein the message received from the base station, relating to the suspension or the resumption of the connection of the UE, indicates that the connection to the UE is being resumed after a suspension.

7. The method as defined in claim 1, further comprising if the key renewal condition is met:
   deriving the NH value before forwarding the new NH, NCC pair to the base station; and
   storing the values of the NH, NCC pair.

8. A Mobile Management Entity ("MME") for use in a communications network, the mobile management entity comprising:
   a processor; and
   a memory coupled with the processor, the memory comprising instructions executable by the processor, such that the MME is operable to:
      receive, by the MME, a message from a base station, relating to a suspension or resumption of a connection of a user equipment ("UE"), the suspension or resumption of the connection of the UE being associated with a transition to or from an idle state;
      in response to receiving the message, determine, by the MME based on a local policy, whether a key renewal condition is met, the local policy being stored at the MME; and
      if the key renewal condition is met, forward, by the MME, a new next hop ("NH"), next hop chaining counter ("NCC") pair to the base station.

9. The MME as defined in claim 8, wherein the message received from the base station indicates a number of key derivations performed with existing keying material, and wherein the memory comprises further instructions executable by the processor, such that the MME is operable to:
   determine whether the key renewal condition is met by determining whether the number of key derivations performed with existing keying material has reached a threshold number indicated in the local policy.

10. The MME as defined in claim 8, wherein the memory comprises further instructions executable by the processor, such that the MME is operable to:
    determine whether the key renewal condition is met by determining whether a time elapsed since forwarding an existing NH, NCC pair to the base station has reached a threshold time indicated in the local policy.

11. The MME as defined in claim 8, wherein the memory comprises further instructions executable by the processor, such that the MME is operable to:
    determine that the key renewal condition is met if the message received from the base station includes a request for the new NH, NCC pair and if an additional criterion indicated in the local policy is satisfied.

12. The MME as defined in claim 8, wherein the memory comprises further instructions executable by the processor, such that the MME is operable to:
    if the key renewal condition is met:
       derive the NH value before forwarding the new NH, NCC pair to the base station; and
       store the values of the NH, NCC pair.

13. A computer program product comprising a tangible computer readable medium and a computer program configured, when run on a computer, to carry out a method comprising:
    receiving, by a Mobile Management Entity ("MME"), a message from a base station, relating to a suspension or resumption of a connection of a user equipment ("UE"), the suspension or resumption of the connection of the UE being associated with a transition to or from an idle state;
    in response to receiving the message, determining, by the MME based on a local policy, whether a key renewal condition is met, the local policy being stored at the MME; and
    if the key renewal condition is met, forwarding, by the MME, a new next hop ("NH"), next hop chaining counter ("NCC") pair to the base station.

14. A method of operation of a base station in a cellular communications network, the method comprising:
    sending, by the base station, a first message to a Mobility Management Entity ("MME") in the cellular communications network, relating to a suspension of a connection of a user equipment ("UE"), the suspension or resumption of the connection of the UE being associated with a transition to or from an idle state, the first message comprising key renewal information;

in response to sending the first message, receiving, by the base station, a second message from the MME including a next hop ("NH"), next hop chaining counter ("NCC") pair; and deriving, by the base station, keying information using the NH, NCC pair for future use in deriving keys.

15. The method as defined in claim 14, further comprising using the NH, NCC pair for deriving keys, and using at least one of the keys in future communications with the UE.

16. The method as defined in claim 14, wherein the key renewal information comprises a number of key derivations performed with existing keying material.

17. The method as defined in claim 14, wherein the key renewal information comprises a request for a new NH, NCC pair.

18. The method as defined in claim 14, wherein the first message relating to the suspension of the connection of the UE indicates that the connection of the UE is being suspended.

19. The method as defined in claim 14, wherein the message relating to the suspension of the connection of the UE indicates that the connection of the UE is being resumed after suspension.

20. A base station for use in a communications network, the base station comprising:
a processor; and
a memory coupled with the processor, the memory comprising instructions executable by the processor, such that the base station is operable to:
send a first message to a Mobility Management Entity ("MME") in the cellular communications network, relating to a suspension of a connection of a user equipment ("UE"), the suspension or resumption of the connection of the UE being associated with a transition to or from an idle state, wherein the first message comprises key renewal information;
in response to sending the first message, receive a second message from the MME that includes a next hop ("NH"), next hop chaining counter ("NCC") pair; and
derive keying information using the NH, NCC pair for future use in deriving keys.

21. The base station as defined in claim 20, wherein the key renewal information comprises a number of key derivations performed with existing keying material.

22. A computer program product comprising a tangible computer readable medium and a computer program configured to run on a computer, to carry out a method comprising:
sending, by a base station, a first message to a Mobility Management Entity ("MME") in the cellular communications network, relating to a suspension of a connection of a user equipment ("UE"), the suspension or resumption of the connection of the UE being associated with a transition to or from an idle state, the first message including key renewal information;
receiving, by the base station, a second message from the MME, the second message including a next hop ("NH"), next hop chaining counter ("NCC") pair, deriving keying information using the NH, NCC pair for future use in deriving keys.

* * * * *

UNITED STATES PATENT AND TRADEMARK OFFICE
CERTIFICATE OF CORRECTION

PATENT NO. : 10,750,361 B2
APPLICATION NO. : 16/072483
DATED : August 18, 2020
INVENTOR(S) : Lehtovirta et al.

It is certified that error appears in the above-identified patent and that said Letters Patent is hereby corrected as shown below:

In the Specification

In Column 1, Line 60, delete "as long" and insert -- as long as --, therefor.

In Column 3, Line 51, delete "so as not obscure" and insert -- so as not to obscure --, therefor.

In Column 7, Line 30, delete "UE EMM" and insert -- UE MME --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*